Dec. 31, 1963     E. E. HOWE     3,115,797
MANDREL SWAGE
Original Filed Nov. 14, 1955
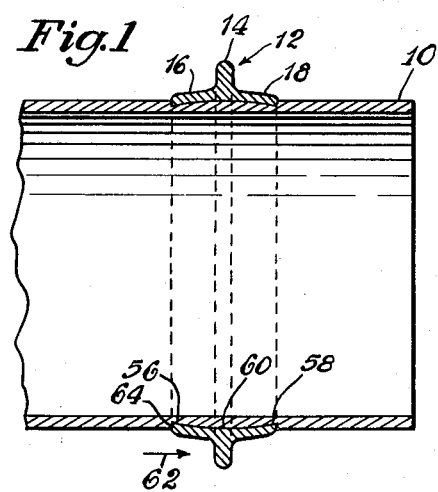
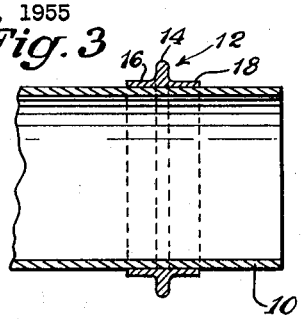
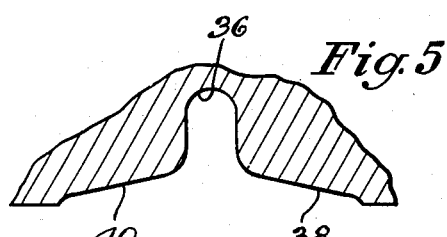
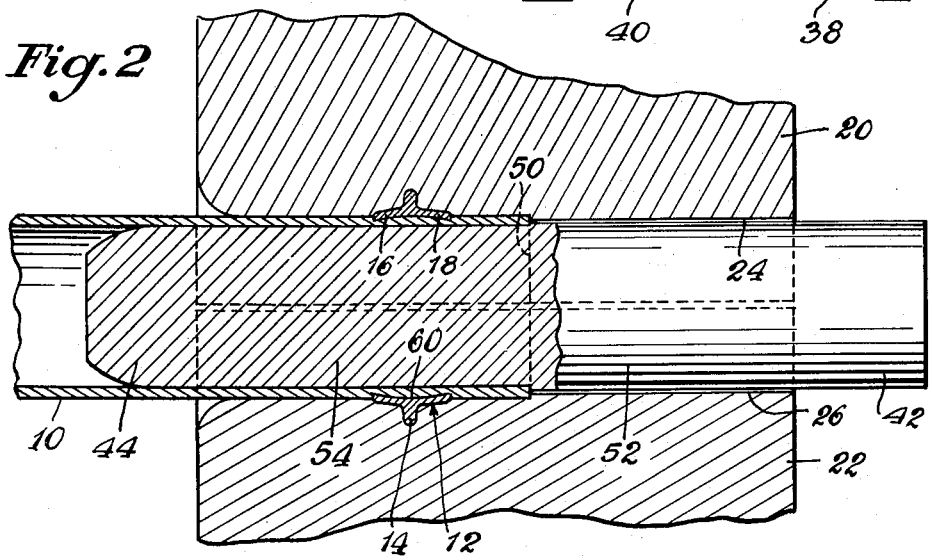
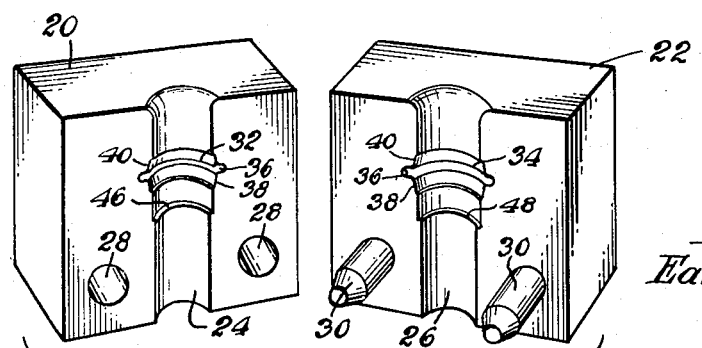
Inventor
Earl E. Howe
by Parker & Carter
Attorneys United States Patent Office 3,115,797
Patented Dec. 31, 1963

3,115,797
MANDREL SWAGE
Earl E. Howe, 6101 Sheridan Road, Chicago, Ill., assignor, by direct and mesne assignments, of fifty percent to Earl E. Howe, Chicago, Ill., and of twenty-five percent to Richard W. Howe, Mount Prospect, Ill., and of twenty-five percent to Margaret H. Frisbey, Erieville, N.Y.
Original application Nov. 14, 1955, Ser. No. 546,328, now Patent No. 2,972,186, dated Feb. 21, 1961. Divided and this application Jan. 18, 1961, Ser. No. 83,459
3 Claims. (Cl. 78—60)

The present application is a division of my previously filed application Serial No. 546,328, filed November 14, 1955, now Patent No. 2,972,186.

This invention is in the field of flexible couplings or fittings, commonly called tube fittings, and is for the purpose of providing an improved fitting or joint or connection between a relatively thin wall tube and another tube casting or the like.

A primary purpose is to provide means for applying to a thin wall tube a ferrule which forms part of such a coupling.

Another object is to provide an apparatus for applying such a ferrule or element to a tube in such a fashion that the connection or fitting will withstand longitudinal forces.

Another object of my invention is a new and improved apparatus for effecting a relatively permanent connection with a relatively thin wall tube without indenting or marring the inner surface of the tube but at the same time, shearing into the body of the tube.

Another object of my invention is a new and improved apparatus for permanently securing a ferrule or rib on a thin wall tube to effect a connection that has increased longitudinal strength.

Another object of my invention is a connection of the above type constructed so that wires having approximately the same diameter as the tube, for example Bowden wire, can be passed into the tube without any interference by the connection.

Other objects will appear from time to time in the ensuing specification and drawings in which:

FIGURE 1 is a section through the end of a tube, on an enlarged scale, showing a ferrule swaged in position;

FIGURE 2 is a section, similar to FIGURE 1 but on a reduced scale, showing the swaging operation;

FIGURE 3 is a view partly in section of the end of a tube with a ferrule in position before swaging;

FIGURE 4 is a perspective of the swaging dies; and

FIGURE 5 is an enlarged section of one of the dies.

This invention is in the field of tube fittings, for example as shown in my prior U.S. Patent No. 2,301,280, in which a ferrule is first secured around the end of a relatively thin wall tube. An elastic grommet or rubber annulus is placed around the ferrule and subjected to compression by a pair of interfitting members which define a compression chamber around the sealing unit. In my prior U.S. Patent No. 2,381,747 I disclose a tool for securing the ferrule on the tube by subjected it to compression.

The rib has been formed as an integral part of the tube by rolling or compressiong the end of the tube outwardly into a continuous bead, an example of this being my prior U.S. Patent No. 2,431,120. In this construction the integral bead forms a joint with adequate longitudinal strength and allows the inner surface of the tube to stay approximately at a constant diameter.

It is an object of this invention to provide a fitting or connection which has the longitudinal strength of an integral bead or rib but is not as expensive or difficult to make.

In FIGURE 3, I have shown a tube 10 of any conventional thin wall type, and although I have stated that this is a thin wall tube, nevertheless many aspects of the invention are not necessarily restricted to thin wall tubes. A ferrule, indicated generally at 12, preferably continuous, is composed of an annulus having an upstanding rib 14, and side flanges 16 and 18 of approximately the same dimensions. The ferrule in the normal manner is slipped over the end of the tube as its inside diameter is aproximately the same but slightly greater than the outside diameter of the tube and it is positioned near the tube end.

A pair of dies, such as shown at 20 and 22, are then positioned around the end of the tube. The dies have generally aligned or opposed grooves or slots 24 and 26 to accept the end of the tube. One die has suitable openings 28 aligned with corresponding positioning pins 30 on the other which guide the dies properly. Each die has an indentation or working station 32 and 34 which conforms generally to the contour of the ferrule and is adapted to work it into the surface of the tube. In FIGURE 2, I have shown the dies in position around the end of the tube and ferrule after pressure has been applied by the dies in a suitable vise or other pressure applying mechanism. Each die includes a deep semi-circular groove 36 which conforms closely to the rib 14 on the ferrule and is dimensioned so that pressure is not applied radially inwardly on the rib. The die surfaces on each side of the groove, as at 38 and 40, slope inwardly toward the surface of the channel so that pressure will be applied from the outer edge of each of the flanges inwardly in a progressive manner toward the rib.

To prevent the inner surface from being distorted, a suitable mandrel or inner support 42 is positioned in the end of the tube and the diameter of the mandrel should be approximately the same as the inside diameter of the tube. The mandrel should protrude slightly on the other side of the dies, as at 44, so that the tube will be supported throughout its length under the dies. Any suitable connecting means can be used for the insertion and removal of the mandrel and this could take the form of an automatic mechanism of any suitable type with the leading edge or end of the mandrel being tapered for easy insertion, if desired. Each of the dies has a shoulder, at 46 and 48, which should abut the end of the tube as a stop. The mandrel may also have a shoulder 50 to engage the end of the tube to fix the distance it is inserted and the mandrel has a large diameter section 52 and a smaller diameter section 54. Section 54 has approximately the same diameter as the I.D. of the tube for a sliding fit. The tube I.D. is at least greater than the O.D. of the shoulder in the dies, and the section 52 of the mandrel has a diameter less than the I.D. of the shoulder in the dies.

It is important that the pressure from the dies be substantially continuous around the tube and directed inwardly on the flanges of the ferrule in a radial direction and at the same time the inner surfaces of the tube should be rigidly supported by a mandrel or otherwise to prevent the tube from collapsing or buckling. In effect, the pressure is applied in two annular bands, rings or zones on the flanges 16 and 18 with no pressure on the rib so that the bands or zones of pressure are spaced from each other. Each annular pressure band is initially applied against the outer edge of the flange and progresses inwardly due to the sloping contour of the die surfaces 32 and 40 toward the rib a predetermined distance until it terminates adjacent the rib.

In FIGURE 1, a finished connection is shown and the edges or flanges of the ferrule have been sheared at 56 and 58 a substantial distance into the surface of the tube while the inner surface remains unmarred and of the same diameter. It is significant that the side edges or outer edges of the ferrule flanges have bitten deeply into the tube and bluntly abut the annular walls or opposed shoulders created by shear in the tube. At the same time, the wall thickness directly under the rib at 60 is approximately the same as the original wall thickness of the tube, and the tube metal formed inwardly away from the shear zones will force the rib outwardly a small amount.

It can, therefore, be seen that a fitting of this nature will have the strength of an integral rib, but the inner surface of the tube is not marred, and a connection formed in this manner will have substantial longitudinal strength. An annular force on the ferrule, indicated by the arrow 62, will be taken by the blunt abutting surfaces at 58 and the flange of the ferrule will not ride up and out of its indented bead in the tube. At the same time, the tube will accept and pass wires or cables which have approximately the same diameter as the inside of the tube. The surface of the tube remains smooth and such a fitting does not cause a bottleneck or restriction.

The use and operation of the invention are as follows:

As shown in FIGURE 2, I insert a support or mandrel 42 in the interior of a tube to underlie the area beneath and adjacent the swaging zone. At the same time or thereafter, I subject the ferrule 12 with its rib 14 to the action of a pair of dies, such as are shown, for example, in FIGURE 4. In use, with the ferrule positioned around the tube and the mandrel positioned within the tube and within the ferrule, the dies are effective to apply a continuous annular pressure inwardly at the outer edges of the flanges of the ferrule. This pressure is progressively increased inwardly toward the rib to force the flange edges into the tube. Meanwhile, the inner surface of the tube is supported by the mandrel during the application of pressure and the original inner diameter of the tube is maintained. Preferably, the application of pressure is terminated while the actual zones of pressure are still spaced from the rib 14 of the ferrule. As earlier described, the die surfaces 38 and 40 are so formed as to apply the pressure from the outer edge of each flange progressively inwardly toward the rib 14.

While I have shown and described the preferred form of my invention, it should be understood that numerous modifications, substitutions, changes, and alterations can be made without departing from the invention's fundamental theme. I, therefore, wish that the invention be unrestricted except as by the appended claims.

I claim:

1. In a device for securing a ferrule on a thin wall tube, a pair of swaging dies with opposed channels to receive within one end portion thereof a thin wall tube and to receive in the opposite end portion thereof a mandrel, a working station in said first-named end portion of the channels conforming generally to the exterior surface of a ferrule positioned around the tube but of less diameter in the outer axial areas so as to compress the outer edges of the ferrule into the surface of the tube when the dies are forced together, and a mandrel having an end segment of a diameter generally equal to the inside diameter of the tube adapted to be inserted in the tube within the working station to support the tube under die pressure, the remaining segment of said mandrel having a diameter greater than that of said mandrel end segment but less than the outer diameter of said tube.

2. The structure of claim 1 in which each of the working surfaces has an indented groove to accept a ribbed ferrule and side surfaces which slope toward the channels, and said channel portions are offset at their juncture to provide a stop means for the inner end of the tube and for said mandrel.

3. The structure of claim 2 wherein said ferrule has a central radially extending annular rib and in which each of the working surfaces has an indented groove to accept a ribbed ferrule and side surfaces which slope toward the channels, said groove being dimensioned to just receive the rib on said ferrule without exertion of inward pressure thereon when said dies have reached their maximum travel towards each other, whereby said pressure is applied progressively inwardly towards said rib from said opposite ends of said ferrule.

References Cited in the file of this patent

UNITED STATES PATENTS

| | | |
|---|---|---|
| 338,501 | Gerald | Mar. 23, 1886 |
| 2,064,129 | Temple | Dec. 15, 1936 |
| 2,382,359 | Weightman | Aug. 14, 1945 |
| 2,878,854 | Batcheller | Mar. 24, 1959 |